Patented May 6, 1941

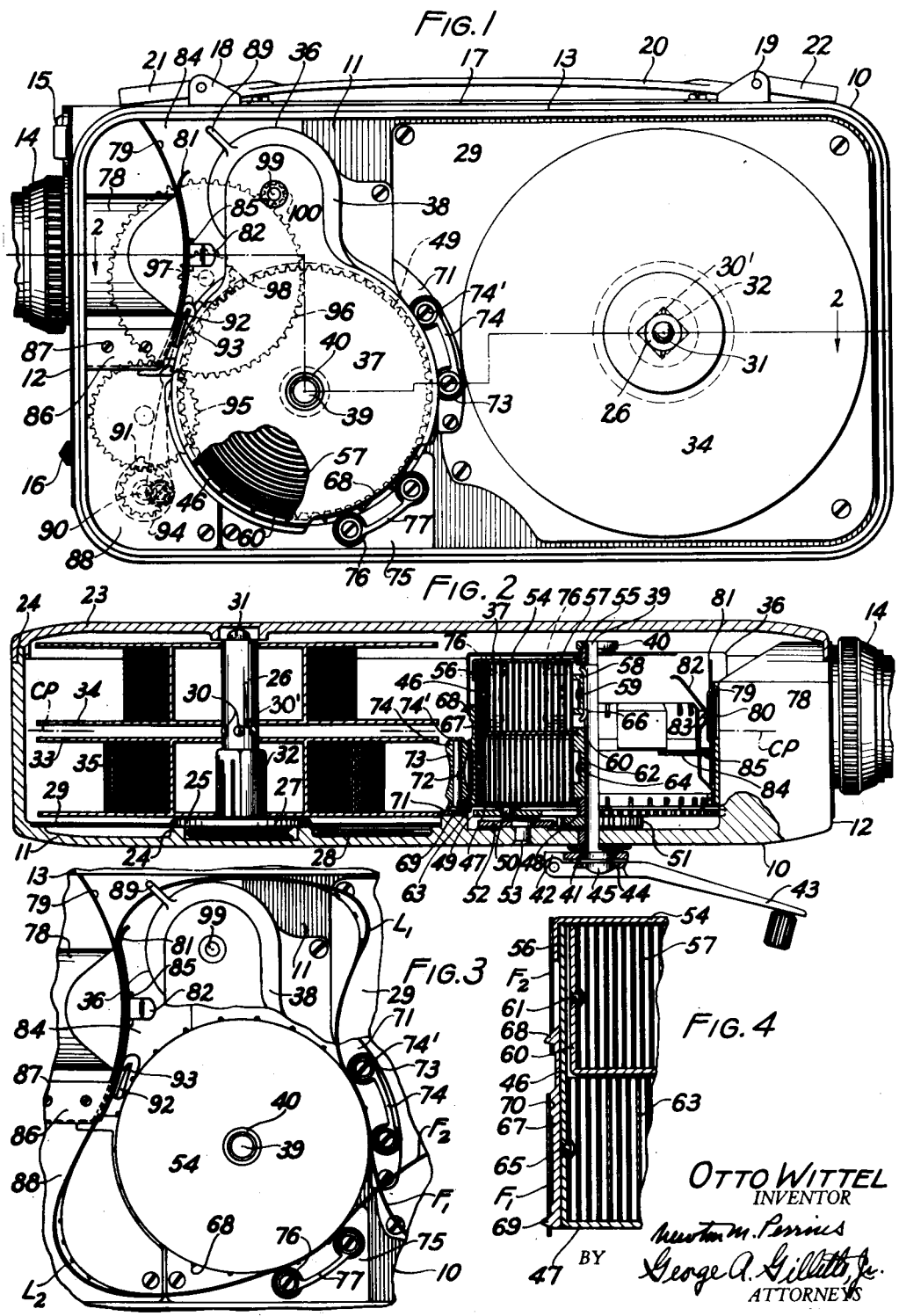

2,241,232

UNITED STATES PATENT OFFICE 2,241,232

FILM HANDLING APPARATUS

Otto Wittel, Rochester, N. Y., assignor to Eastman Kodak Company, Rochester, N. Y., a corporation of New Jersey Application December 13, 1939, Serial No. 308,972

14 Claims. (Cl. 88—17)

The present invention relates to a film handling apparatus and more particularly to a compact arrangement of the operating mechanisms in a double plane film loading type of motion picture camera.

While double plane loading of film handling apparatus is known, the various operating mechanisms of such previous apparatus have been individually provided so that the resultant apparatus is relatively large or inconvenient to manipulate. My prior U. S. Patent No. 1,933,782 granted November 7, 1933 shows that a single plane film handling apparatus may be rendered more compact by combining the sprocket drum and spring motor, however, the adaptation of that invention to a double plane loading film apparatus has additional advantages resulting in a compact apparatus with greater capacity for storing potential energy or for moving film through the apparatus.

The primary object of the present invention is the provision in a film handling apparatus of a sprocket means for maintaining a preformed loop in a film strip, carrying axially displaced peripheral rows of teeth, and containing a pair of spring motor members in coaxial relationship therein.

Another object of the invention is the combination of a sprocket means for maintaining a preformed film loop having a tendency for lateral inclination and a film gate assembly including one or more edge guides against which the film edge is held by virtue of such tendency for inclination in the loop.

A further object of the invention is the combination with a pair of coaxially mounted film holders, of a sprocket means carrying axially displaced peripheral rows of teeth for engaging spaced portions of a film strip in edge to edge relation, and a pair of spring motor members in coaxial relationship within said sprocket means.

Other and further objects of the invention will be clear to those skilled in the art from the disclosure which follows.

The above and other objects of the invention are embodied in a film handling apparatus comprising in combination, a spindle member adapted to support a pair of film holders in coaxial relationship, a sprocket means for maintaining a preformed loop in a film strip extending from one film holder to the other and including a drum carrying axially displaced peripheral rows of teeth, a pair of spring motor members in coaxial relation within said drum, and a film gate assembly centrally located with respect to said drum and for guiding the film through said preformed loop. Preferably the spring motor members within the drum of the sprocket means are arranged in series and the film portions engaged by the sprocket drum are in edge to edge relationship. Edge guides of the film gate assembly are engaged by the tendency of the preformed film loop to have a lateral inclination.

Reference is now made to the accompanying drawing wherein similar reference characters designate similar elements and wherein:

Fig. 1 is a side elevation of a film handling apparatus embodying the present invention.

Fig. 2 is a longitudinal transverse section through such film handling apparatus and taken on the line 2—2 of Fig. 1.

Fig. 3 is a fragmentary side elevation of the sprocket means of the invention with a portion of the cover member broken away for better illustration thereof; and Fig. 4 is a fragmentary cross section to enlarged scale of the sprocket drum.

Although the present invention is disclosed and described as incorporated in a motion picture camera, it is to be understood that the invention may be utilized to equal advantage in any form of film handling apparatus of the double plane loading type.

In the illustrated embodiment of the invention, the film handling apparatus or motion picture camera is enclosed in a casing 10 having a side wall 11 and a lateral wall including a front lateral wall 12 and a top lateral wall 13. An objective member 14 is mounted upon said front lateral wall 12 in any convenient manner such as a fastening means 15. A control lever 16 is also mounted on said front lateral wall 12 and is arranged in a known manner for controlling operation of the apparatus. A plate 17 is attached to top lateral wall 13 and includes ears 18 and 19 between which a carrying handle 20 is fastened. A front finder element 21 is pivotally mounted between ears 18 and a rear finder element 22 is pivotally mounted between ears 19 so that said finder elements 21 and 22 may be moved into an upright operative position or may be folded flat along the top lateral wall 13. A casing cover 23 has a rabbeted edge flange for light-tight engagement with the edges of the lateral wall of casing 10 and, as shown in Fig. 2, encloses the interior of said casing 10.

According to the present invention the film holders are preferably arranged in coaxial relation with respect to each other as in the manner about to be described. A circular bushing 24 integral with the interior of side wall 11 is covered by a disk 25 on which the spindle 26 is rotatably mounted. A pulley 27 is mounted on one end of spindle 26 within the circular bushing 24 and is encircled by a spring belt 28 which is driven in a known manner by the operating mechanism. A cover plate 29 is fastened to side wall 11 to cover the spring belt drive to the spindle member.

A plurality of ballbearings 30 are centrally mounted in spindle 26, are for the purpose of separating the film holders thereon, and are retracted in a manner, not shown by the plunger 31. One or more lugs 30' resiliently protrude in conventional manner from spindle 26 for engagement with the take-up reel 34 to form a driving connection thereto. A square sleeve 32 is mounted on spindle 26 adjacent the disk 25 and is arranged, as by the provision of slots therein, frictionally to engage the spindle 26. Such square sleeve 32 serves both as a locating guide so that the film holders must be inserted in a predetermined relation and as a friction drag between the supply film holder and the spindle 26 to prevent undesirable overrunning of the film holder when the apparatus is stopped. The film holders may be of standard type such as the flanged film reels 33 and 34. The supply film reel 33 carries a supply coil of film 35 and is provided with an axial opening, of known design, so that said reel 33 may be inserted over spindle 26 and square sleeve 32 in a predetermined position. The take-up film reel 34 is also provided with axial openings and is mounted on the outer end of spindle 26, being separated from supply reel 33 by the ballbearings 30. In this manner the film holders or film reels 33 and 34 are mounted on the spindle member in coaxial relationship with respect to each other.

The sprocket means maintains a preformed loop in the film strip extending from one film holder to the other. According to the invention the sprocket means includes a drum carrying axially displaced peripheral rows of teeth and a pair of spring motor members in coaxial relation within said drum. Said sprocket means is partially supported and partially enclosed by a cover member 36 including a large cup-shaped casing 37 and a small cup-shaped portion 38. A shaft 39 is journaled at one end in a bearing 40 on casing 37 and at the other end in a bushing 41 in side wall 11. A winding means for the shaft 39 comprises a collar member 42 rotatably mounted on shaft 39, a handle 43 pivoted to collar member 42 and provided with a square opening 44 for engaging the square end 45 of shaft 39 protruding beyond side wall 11 and collar member 42.

The spring drum has a cylindrical peripheral wall 46 and an end wall 47 including a bushing 48 journaled on shaft 39. A large ring pinion gear 49 is attached to said end wall 47 by rivets 50. A ratchet wheel 51 is keyed to shaft 39 and is engaged by a spring pressed pawl 52 mounted on a stud 53 on side wall 11. Said pawl 52 and ratchet wheel 51 prevent reverse rotation of the shaft 39 for said spring drum in a well understood manner.

A cap member 54 carries a bearing sleeve 55 between the end of shaft 39 and bearing 40 and has a peripheral flange 56 overlying the cylindrical peripheral wall 46 of the spring drum. A spiral spring motor member 57 has its inner end fastened to an arbor 58 by a rivet 59 and has its outer end fastened to the peripheral wall of a cup-shaped intermediate member 60 by a rivet 61. Said intermediate member 60 includes a sleeve 62 rotatable on shaft 39. A second spiral spring motor member 63 has its inner end attached to sleeve 62 by a rivet 64 and its outer end attached to the peripheral wall 46 of the spring drum by a rivet 65. The arbor 58 is fastened by a key 66 to rotate with the shaft 39.

It will now be understood that rotation of the handle 43 and shaft 39 will wind the spring motor member 57 and through intermediate member 60 will wind the spring motor member 63 so that considerable potential energy can be stored within the spring drum. By reason of ratchet wheel 51 and pawl 52, such potential energy can only be dissipated by rotation of the spring drum or cylindrical wall 46 and the large pinion gear 49.

The coaxial relationship of the spring motor members 57 and 63 requires or provides a spring drum of greater axial extent but this increased length of the spring drum is of peculiar advantage to the sprocket means because the necessary length for axially displacing the sprocket teeth on the drum is so provided.

The axially displaced peripheral rows of teeth on the sprocket drum may be provided in any convenient manner but may also be arranged, as disclosed herein, to advantageously support the film engaged by the teeth and to facilitate threading of the film. A sleeve 67 is mounted over one side of the peripheral wall 46, as by a press fit, and carries one peripheral row of teeth 68, a second and axially displaced row of peripheral teeth 69, and a peripheral shoulder 70. The film strip $F_1$ extends from the supply film reel 33 and into engagement with the sprocket drum, having one marginal row of perforations in engagement with the peripheral row of teeth 69 and having the other perforated margin thereof bearing upon the peripheral shoulder 70 of sleeve 67. A guiding assembly is located so as to maintain said film strip $F_1$ entering the film loop in engagement with said teeth 69 and comprises a supporting plate 71, a pair of posts 72, a pair of concave rollers 73 freely rotatably on posts 72, and a brace 74 connected at each end to the top of the posts 72 by screws 74'. In a similar manner the film strip $F_2$ leaving the film loop and passing to the take-up film roll reel 34 is held against the axially displaced teeth on the sprocket drum by an axially displaced film guide assembly. Such second film guide assembly is mounted upon an intermediate supporting plate 75 and also comprises a pair of concave rollers 76 and an intermediate brace 77. Said second film guide assembly not only holds the film strip $F_2$ with one row of perforations in engagement with the teeth 68 but also maintains the other margin of the film against the peripheral flange 56 of cap member 54 which thus also serves to support the film parallel to the axis of the drum.

By virtue of the axial displacement of the rows of teeth 68 and 69 and of the film guide assemblies holding the film strips $F_1$ and $F_2$ in engagement with the sprocket drum, the spaced film portions in engagement with the sprocket drum are in edge to edge relationship with respect to each other and the intermediate film loop has a tendency to assume a lateral inclination. Such lateral inclination is a function both of the axial displacement of the sprocket teeth and film guides and of the inherent resiliency of the film in the preformed loop.

According to the invention herein disclosed, this tendency for lateral inclination of the film in the loop is utilized to obtain sidewise steadiness of the film at the gate in a manner now to be described. The film gate may be provided in any recognized fashion and preferably guides the film in a path parallel to a central plane which is perpendicular to the rotational axis of the sprocket drum. Such an imaginary central plane is indicated by the dot-dash line CP—CP of Fig. 2, is perpendicular to the axis of shaft 30, passes between the film portions in engagement with the respective rows of teeth 68 and 69, and passes between the film reels 33 and 34. A housing 78 is provided in casing 10 behind the objective member 14 and may enclose a shutter member, not shown. The rear face of housing 78 is convex and carries a convex plate 79 provided with an exposure aperture 80. A pressure pad 81 is also curved to conform to plate 79, and is resiliently pressed thereagainst by a spring arm 82 which engages a pin 83 on the back of pressure pad 81. The convex plate 79 and corresponding pressure pad 81 are embossed in a known manner so as to engage only the margins of the film at the gate and so that the central or picture areas of the film are not scratched by passage through the gate.

The film gate assembly also includes a pair of edge guides for engaging the edges of the film and for laterally centering the image areas of the film with respect to the exposure aperture 80. One such edge guide may be formed as a guide plate 84 which is centrally and longitudinally mounted within the casing on the far side of the film gate and which is provided with an opening 85 through which the spring arm 82 and an extension of pressure pad 81 extend. As the film in the upper loop L₁ approaches the film gate, it will tend to have a lateral inclination but the edge guide plate 84, being parallel to said central plane, will guide the film in a path parallel to said central plane. The other edge guide may be composed of a flange 86 fastened by screws 87 to housing 78 and having one end laterally overlapping the upper or near edge of the film leaving the film gate. A cover plate 88 in the lower forward corner of the casing is in the same plane as guide plate 84 and may be conveniently supported by connection to flange 86 through a step, not shown. The projecting end of flange 86 will also act against the tendency for inclination of the film in the loop and will maintain the film at the gate in a path parallel to the central plane. However, such tendency for inclination of the film in the loop will hold the edges of the film against the oppositely positioned film guides, such as guide plate 84 and flange 86, and will insure that the film is centered with respect to the exposure aperture 80 and is normally maintained in such laterally correct position. The film leaving the film gate in edge contact with flange 86 passes through the lower loop L₂ into engagement with the teeth 68 on the sprocket drum to become film strip F₂ passing to the take-up reel 34.

The threading operations for the film handling apparatus as disclosed are as follows, sufficient film is withdrawn from supply film reel 33 to pass through the loops L₁ and L₂ and onto the take-up reel 34. Then the portion of the film adjacent supply reel 33 is laterally inserted between the peripheral row of teeth 69 and the adjacent or lower film guide assembly, the upper loop L₁ is then formed, the film is then inserted between convex plate 79 and pressure pad 81, the lower loop L₂ is formed, the film is laterally inserted between the peripheral row of teeth 68 and the upper film guide assembly and is then attached to the take-up reel 34. When the film is being moved from its laterally inclined position at the film gate by insertion between plate 79 and pad 81, the upper loop L₁ may tend to be raised with respect to the sprocket drum sufficiently to become disengaged from the teeth 69. In order to overcome this threading difficulty, a projection 89 is provided on the small cup-shaped portion 38 of cover member 36 for overlapping the upper edge of the film in loop L₁ and preventing the displacement of the film when the film at the gate is moved into its parallel relation.

Although the edges of the film will be properly held against the edge guides by the tendency of lateral inclination of the film loop, it is preferable that the exposure aperture 80 and accompanying film gate structure be laterally offset with respect to the central plane CP, see Fig. 2. In this manner the tendency for lateral inclination acts primarily upon the guide plate 84 which extends the entire length of the film gate.

The other operating mechanisms of the film handling apparatus will be briefly described. A shaft 90 is rotatably mounted below the film gate and carries a single toothed disk 91 which may be engaged by a control mechanism and to which a film claw 92 is eccentrically pivoted. Said film claw 92 is preferably of the ratchet type and carries a tooth 93 for passing through pressure pad 81 and engaging the perforated margins of the film at the film gate. Said pulldown shaft 90 carries a pinion gear 94 meshing with an intermediate gear 95 in engagement with a large pinion gear 96 on a shaft 97. A small pinion gear 98 is also mounted on shaft 97 and is driven by the large ring pinion gear 49 on the end wall 47 of the spring drum. A centrifugal governor assembly, not shown, is mounted within the small cup-shaped portion 38 of cover member 36 and includes a shaft 99 carrying a small pinion gear 100 in mesh with the aforementioned large pinion gear 96.

The film handling apparatus disclosed herein will have an extremely long operating period for one winding of the spring motor assembly and as compared to the compactness of the apparatus. It is to be understood that the spring motor members may be arranged independently or in parallel relation but are preferably connected in series as shown. Other modifications of the invention will occur to those skilled in the art. Consequently, the present disclosure is to be construed only in an illustrative sense and the scope of the invention is defined by the claims which follow.

Having now particularly described my invention what I desire to secure by Letters Patent of the United States and what I claim is:

1. In a film handling apparatus, the combination with a spindle member adapted to support a pair of film holders in coaxial relationship, a sprocket means for maintaining a preformed loop in a film strip extending from one film holder to the other and including a drum carrying axially displaced rows of teeth, one row of teeth being located to engage the film from one of said film holders and another row of teeth being located to engage the film being fed to the other of said film holders, and a pair of spring motor members in coaxial relation within said drum, of a film gate assembly opposite but adjacent to said drum and for guiding the film in said preformed loop.

2. In a film handling apparatus, the combination with a sprocket means for engaging spaced portions of a film strip to maintain a preformed loop therein and including a drum mounted for rotation about an axis and peripheral rows of teeth axially displaced on said drum and on opposite sides of a central plane perpendicular to the axis of said drum and for engaging the spaced film portions in edge to edge relationship and imparting to said film loop a tendency to be inclined to said central plane, of a film gate assembly including an edge guide for guiding the film through said loop in a path parallel to said central plane and against which the film edge is held by virtue of the tendency for inclination in said loop.

3. In a film handling apparatus, the combination with a sprocket means for engaging spaced portions of a film strip to maintain a preformed loop therein and including a drum mounted for rotation about an axis and peripheral rows of teeth axially displaced on said drum and on opposite sides of a central plane perpendicular to the axis of said drum and for engaging the spaced film portions in edge to edge relationship and imparting to said film loop a tendency to be inclined to said central plane, of a film gate plate provided with an aperture having its center to one side of said central plane, and an edge guiding member located to center a film with respect to said aperture but against which the film is held by virtue of the tendency for inclination of said loop.

4. In a film handling apparatus, the combination with a sprocket means for engaging spaced portions of a film strip to maintain a preformed loop therein and including a drum mounted for rotation about an axis and peripheral rows of teeth axially displaced on said drum and on opposite sides of a central plane perpendicular to the axis of said drum and for engaging the spaced film portions in edge to edge relationship and imparting to said film loop a tendency to be inclined to said central plane, of a film gate assembly including a pair of edge guiding members located on opposite sides of the film, for guiding the film through said gate assembly in a path parallel to said central plane, and against which the edges of the film are held by virtue of the tendency for inclination of said loop.

5. In a film handling apparatus, the combination with a casing, a sprocket means therein for engaging spaced portions of a film strip to maintain a preformed loop therein and including a drum mounted for rotation about an axis and peripheral rows of teeth axially displaced on said drum and on opposite sides of a central plane perpendicular to the axis of said drum and for engaging the spaced film portions in edge to edge relationship and imparting to said film loop a tendency to be inclined to said central plane, and a cover member in said casing and encircled by said film loop, of a film gate assembly for guiding the film through said loop in a path parallel to said central plane, and a projection on said cover member adapted to overlap a portion of said film loop and for guiding the same into said film gate assembly.

6. In a motion picture apparatus, the combination with a casing, an objective member on said casing, a housing in said casing in line with said objective, a sprocket means for engaging spaced portions of a film to maintain a preformed loop therein and including a drum rotatably mounted in said casing and carrying axially displaced rows of teeth, one row of teeth being located to engage the film entering said loop and another row of teeth being located to engage the film leaving said loop, and said rows of teeth being axially displaced so that the film entering the loop is in edge to edge relationship to the film leaving said loop and the film in said loop tends to have a lateral inclination, of a longitudinal plate in said casing, a film gate assembly on said housing and opposite said drum, and a projection on said housing for engaging one side of the film at the gate and holding the other edge of said film against said longitudinal plate.

7. In a film handling apparatus, the combination with a spindle member adapted to support a pair of film holders in coaxial relationship, of a sprocket means for maintaining a preformed loop in a film strip extending from one film holder to the other and including a rotatable drum carrying axially displaced rows of teeth for respectively engaging the film from one of said film holders and being fed toward the other film holder, and a pair of spring motor members in coaxial relationship within said drum.

8. In a film handling apparatus, the combination with a spindle member rotatable about an axis and adapted to support a pair of film holders in coaxial relationship, and a sprocket means for maintaining a preformed loop in a film strip extending from one film holder to the other and including a rotatable drum carrying axially displaced rows of teeth, one row of teeth being located in alignment with one film holder to engage the film extending therefrom and another row of teeth being located in alignment with the other film holder to engage the film extending thereto, of a pair of guide assemblies mounted adjacent said drum and for holding said film strip in engagement with the rows of teeth on said drum, and a pair of spring motor members in coaxial relationship within said drum.

9. In a film handling apparatus, the combination with a spindle member rotatable about an axis and adapted to support a pair of film holders in coaxial relationship, and a sprocket means for maintaining a preformed loop in a film strip extending from one film holder to the other and including a rotatable drum carrying axially displaced rows of teeth, one row of teeth being located in alignment with one film holder to engage the film extending therefrom and another row of teeth being located in alignment with the other film holder to engage the film extending thereto, of a pair of guide assemblies laterally displaced and mounted adjacent said drum, one guide assembly being adapted to hold only the film from one said film holder in engagement with one row of teeth on said drum and the other guide assembly being adapted to hold only the film being fed to the other film holder in engagement with the other row of teeth on said drum, and a pair of spring motor members in coaxial relationship in said drum.

10. In a film handling apparatus, the combination with a shaft, a drum rotatably mounted on said shaft, and teeth on said drum arranged in two rows which are axially displaced for engagement respectively with film portions in edge to edge relationship, of a pair of spring motor members coaxially arranged within said drum and connected between said shaft and said drum.

11. In a film handling apparatus, the combination with a shaft, a drum rotatably mounted on said shaft, and teeth on said drum arranged in two rows which are axially displaced for engagement respectively with film portions in edge to edge relationship, of a pair of spring motor members coaxially arranged within said drum and connected in series between said shaft and said drum.

12. In a film handling apparatus, the combination with a shaft, a drum rotatably mounted on said shaft, and teeth on said drum arranged in two rows which are axially displaced for engagement respectively with film portions in edge to edge relationship, of a pair of spring motor members encircling said shaft and coaxially arranged within said drum, the inner end of one spring motor member being attached to said shaft and the other end of the other spring motor member being attached to said drum, and an intermediate member rotatably mounted on said shaft and to which the outer end of said one spring motor member and the inner end of said other spring motor member are attached for operation of said spring motor members in series.

13. A spring motor comprising a shaft, a cup-shaped casing rotatably mounted thereon, a sleeve member encircling said casing and carrying a peripheral row of teeth, and a cap member enclosing the end of said casing and having a peripheral flange overlying said casing and for supporting one margin of a film strip which has its other margin supported by said sleeve member and engaged by said teeth thereon.

14. A spring motor comprising a shaft, a cup-shaped casing rotatably mounted thereon, a sleeve member encircling said casing and carrying a peripheral row of teeth, and a cap member enclosing the end of said casing, having a central bearing rotatable on said shaft, and having a peripheral flange overlying said casing and for supporting one margin of a film strip, the other margin of which is supported by said sleeve member and engaged by the teeth thereon.

OTTO WITTEL.